United States Patent
Park et al.

(10) Patent No.: US 8,091,389 B2
(45) Date of Patent: Jan. 10, 2012

(54) MULTIPLE LAUNDRY MACHINE

(75) Inventors: Sang Ho Park, Changwon-si (KR); Phal Jin Lee, Changwon-si (KR); In Haeng Cho, Changwon-si (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 12/310,350

(22) PCT Filed: Aug. 22, 2007

(86) PCT No.: PCT/KR2007/004004
§ 371 (c)(1),
(2), (4) Date: Feb. 23, 2009

(87) PCT Pub. No.: WO2008/023925
PCT Pub. Date: Feb. 28, 2008

(65) Prior Publication Data
US 2009/0193856 A1 Aug. 6, 2009

(30) Foreign Application Priority Data

Aug. 23, 2006 (KR) .......... 10-2006-0079892
Aug. 23, 2006 (KR) .......... 10-2006-0079893
Aug. 23, 2006 (KR) .......... 10-2006-0079894

(51) Int. Cl.
*D06F 39/04* (2006.01)

(52) U.S. Cl. .......... 68/3 R; 68/19.1

(58) Field of Classification Search .......... 68/3 R, 68/19.1, 208, 15
See application file for complete search history.

(56) References Cited

U.S. PATENT DOCUMENTS

| | | | |
|---|---|---|---|
| 2,833,137 A * | 5/1958 | Geldhof .......... | 68/19.2 |
| 3,035,428 A * | 5/1962 | Curtis et al. .......... | 68/18 F |
| 3,139,744 A * | 7/1964 | Alstyne et al. .......... | 68/20 |
| 3,555,701 A * | 1/1971 | Hubbard .......... | 34/602 |
| 4,236,320 A * | 12/1980 | Schwadike et al. .......... | 34/428 |
| 4,462,225 A | 7/1984 | Noe | |
| 4,507,942 A * | 4/1985 | Hirose et al. .......... | 68/20 |
| 4,510,778 A * | 4/1985 | Cotton .......... | 68/12.15 |
| 4,535,610 A * | 8/1985 | Fey et al. .......... | 68/3 R |
| 4,663,538 A * | 5/1987 | Cotton et al. .......... | 307/38 |
| 4,989,426 A * | 2/1991 | Kretchman et al. .......... | 68/3 R |
| 5,444,996 A * | 8/1995 | Joslin et al. .......... | 68/12.04 |
| 7,096,601 B2 * | 8/2006 | Lyu et al. .......... | 34/595 |
| 2002/0017117 A1 | 2/2002 | Sunshine et al. | |
| 2003/0115682 A1* | 6/2003 | Gardner .......... | 8/159 |
| 2004/0194339 A1 | 10/2004 | Johnson et al. | |
| 2005/0132756 A1* | 6/2005 | Yang et al. .......... | 68/12.15 |
| 2006/0090524 A1 | 5/2006 | Jeon et al. | |
| 2006/0112585 A1 | 6/2006 | Choi et al. | |

(Continued)

FOREIGN PATENT DOCUMENTS

EP 1 029 961 * 11/1999

(Continued)

*Primary Examiner* — Frankie L Stinson (74) *Attorney, Agent, or Firm* — McKenna Long & Aldridge LLP (57) ABSTRACT

A multiple laundry machine, in which an auxiliary drying device is coupled to a general laundry machine, is disclosed. The multiple laundry machine includes a laundry machine for washing or drying laundry contained in an interior of the laundry machine, an auxiliary drying device arranged at one side of the laundry machine, the auxiliary drying device having a laundry container formed in an interior of the auxiliary drying device, and a driver provided at the auxiliary drying device, to drive the auxiliary drying device.

13 Claims, 8 Drawing Sheets

U.S. PATENT DOCUMENTS

| | | |
|---|---|---|
| 2006/0150689 A1 | 7/2006 | Kim et al. |
| 2006/0156765 A1 | 7/2006 | Sunshine |
| 2007/0151120 A1 * | 7/2007 | Tomasi et al. .................. 34/601 |

FOREIGN PATENT DOCUMENTS

| | | |
|---|---|---|
| EP | 1 439 258 | 7/2004 |
| EP | 1 616 991 | 1/2006 |
| JP | 54-108060 | 8/1979 |
| JP | 63-127788 * | 5/1988 |
| JP | 02-128797 | 5/1990 |
| JP | 04-187194 | 7/1992 |
| JP | 05-305197 | 11/1993 |
| JP | 2001-046799 | 2/2001 |
| KR | 10-2005-0115968 | 12/2005 |
| KR | 10-2006-0071368 | 2/2006 |
| KR | 10-2006-0064821 | 6/2006 |
| KR | 10-2006-0079892 | 7/2006 |
| SU | 211514 | 9/1970 |

* cited by examiner

MULTIPLE LAUNDRY MACHINE

This application is a 35 U.S.C. §371 National Stage entry of International Application No. PCT/KR2007/004004, filed on Aug. 22, 2007, and claims priority to Korean Application Nos. KR 10-2006-0079892, filed on Aug. 23, 2006, KR 10-2006-0079893, filed on Aug. 23, 2006, KR 10-2006-0079894, filed on Aug. 23, 2006 all hereby incorporated by reference in its entireties.

TECHNICAL FIELD

The present invention relates to a laundry machine, and more particularly, to a multiple laundry machine configured by coupling an auxiliary drying device to a general laundry machine.

BACKGROUND ART

Generally, a laundry machine means an apparatus for washing, drying, or washing and drying laundry. One laundry machine can perform only a washing function or a drying function or can perform both the washing and drying functions. Recently, a laundry machine, which includes a steam supplier, to have a refresh function for, for example, removal of creases, odor, static electricity, etc. from laundry, has been available.

Meanwhile, conventional laundry machines are classified into a front loading type and a top loading type in accordance with the direction that laundry is taken out. Also, conventional laundry machines are classified into a vertical-axis type, in which a pulsator or a washing tub rotates, and a horizontal-axis type, in which a drum rotates. The representative example of such a horizontal-axis type laundry machine is a drum washing machine or a drum drying machine.

Such laundry machines have a tendency to have a large size, in order to meet the recent demand of users. That is, laundry machines used for domestic purposes have a tendency to have a large outer size.

Meanwhile, there are conventional laundry machines having no drying function. In association with such a laundry machine, which may be a washing machine, there is a problem in that, when the user wants a drying function, it is necessary to purchase a separate drying machine or a separate washing machine having a drying function. Thus, when it is desired to obtain both the washing function and the drying function, the expenses burden on the consumer mist correspondingly increase.

Where laundry machines having a drying function have a large size, there may be a problem in terms of saving of energy because they are driven in a large capacity even when a small amount of laundry is dried. Meanwhile, in drum type drying machines, there is a problem in that it is difficult to dry shoes or clothes. Of course, it may be possible to dry shoes, etc. by installing a rack in a drum, to lay the shoes on the rack, and maintaining the rack in a horizontal state, irrespective of a rotation of the drum. In this case, however, there is an inconvenience because the user should frequently perform the installation and separation of the rack.

Figure 1:
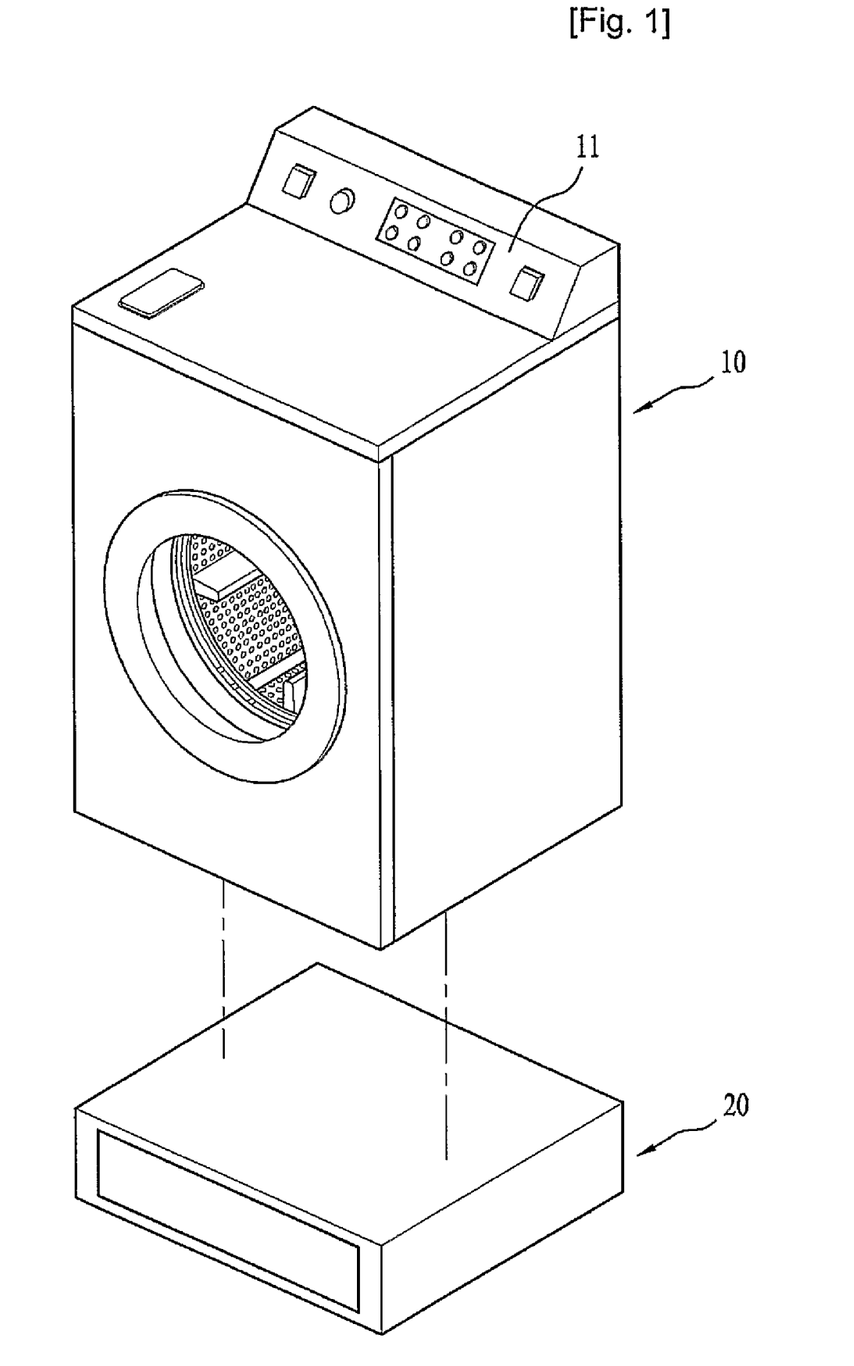
FIG. 1 is a perspective view illustrating a conventional laundry machine including a pedestal.

FIG. 1 is a perspective view illustrating a conventional laundry machine.

As shown in FIG. 1, the conventional laundry machine 10 includes a body forming the cuter structure of the laundry machine 10, and a control panel 11 arranged at the front surface or top surface of the body. The control panel 11 may include a controller for controlling the operation of the laundry machine 10. In accordance with this configuration, the user enables the laundry machine 10 to perform a laundry operation such as a washing operation or a drying operation by manipulating the control panel 11.

The laundry machine 10 may be a washing machine, a drying machine, or a washing/drying machine.

The laundry machine 10 may further include a pedestal 20 for supporting the laundry machine 10 on a floor. In this case, the laundry machine 10 is laid on the pedestal 20.

In the conventional laundry machine, however, the pedestal 20 does not have any function for treating laundry.

DISCLOSURE OF INVENTION

Technical Problem

The present invention has been made in view of the above-mentioned problems, and an object of the present invention is to provide a combination of a laundry machine with an auxiliary drying device capable of treating a small amount of laundry without driving the laundry machine, which has a relatively-large capacity, to achieve a convenience in use and to save energy.

Another object of the present invention is to provide a multiple laundry machine, which includes a washing machine only having a washing function, and a drying function easily addable to the washing machine.

Another object of the present invention is to provide a multiple laundry machine capable of easily drying laundry including shoes, hats, etc. which are difficult to be dried using a conventional drum type drying machine.

Still another object of the present invention is to utilize an auxiliary space defined in a conventional laundry machine, such as a pedestal, as an auxiliary drying device.

Technical Solution

The objects of the present invention can be achieved by providing a multiple laundry machine comprising: a laundry machine for washing or drying laundry contained in an interior of the laundry machine; an auxiliary drying device arranged at one side of the laundry machine, the auxiliary drying device having a laundry container formed in an interior of the auxiliary drying device; and a driver provided at the auxiliary drying device, to drive the auxiliary drying device.

Preferably, the auxiliary drying device has a volume and a height respectively smaller than a volume and a height of the laundry machine. This is because the auxiliary drying device is adapted to perform auxiliary functions for the laundry machine.

The laundry machine may be a general washing machine. The auxiliary drying device may be installed and used independently of the laundry machine. However, it is preferred that the auxiliary drying device be coupled to one side of a body of the laundry machine by a coupler. This is because it is desirable to integrate laundry devices including the laundry machine and the auxiliary drying device, which assists the laundry machine, in order to effectively carry cut a series of laundry treating processes. It is also preferred that the auxiliary drying device be coupled to the laundry machine, in terms of the utilization of space.

Of course, the laundry machine, which is a main component of the multiple laundry machine, may be a washing machine, a drying machine, or a washing/drying machine. However, the laundry machine is not limited to such machines. The laundry machine may be a spin-drying machine, which only performs a spin drying function.

The driver may be controlled by a controller provided at the auxiliary drying machine. In this case, the controller may be arranged at a control panel of the auxiliary drying device.

A main controller for controlling an operation of the laundry machine may be provided at the laundry machine. In this case, the driver may be controlled by the main controller. In this case, it is preferred that the controller be arranged at a control panel of the laundry machine.

The driver may comprise an air supplier for forcibly supplying air to the laundry container. The air supplier may comprise a blowing fan for blowing air, and a heater for heating air. In accordance with this configuration, it is possible to dry laundry through the auxiliary drying device.

The driver may further comprise at least one of a temperature sensor for sensing an internal temperature of the laundry container and a humidity sensor for sensing an internal humidity of the laundry container. In this case, it is possible to more effectively achieve a desired drying function, based on the temperature sensed by the temperature sensor or the humidity sensed by the humidity sensor.

The driver may further comprise a steam supplier for supplying steam to the laundry container.

Preferably, the auxiliary drying device is a pedestal for supporting the laundry machine on a floor. Preferably, the laundry container has a form of a drawer drawable forwardly at a front side of the body of the auxiliary drying device.

Inlets may be formed at an upper portion of a rear wall of the auxiliary drying device, to introduce air into the auxiliary drying device. Also, outlets may be formed at a lower portion of the rear wall of the auxiliary drying device, to outwardly discharge air from the auxiliary drying device. Preferably, an upper rear wall portion of the drawer communicates with the inlets. Preferably, a lower rear wall portion of the drawer communicates with the outlets.

Preferably, the air supplier and steam supplier are arranged between the rear wall of the drawer and the rear wall of the auxiliary drying device.

Of course, for the installation of the above-described elements, the side walls of the auxiliary drying device and drawer may be used, in place of the rear walls of the auxiliary drying device and drawer. In this case, introduction and discharge of air are carried cat at one lateral side of the auxiliary drying device, in place of the rear side of the auxiliary drying device. Since the "rear side" and "lateral side" are different from each other, only in terms of the reference direction, it may be considered that the introduction and discharge of air at one lateral side of the auxiliary drying device include the introduction and discharge of air at the rear side of the auxiliary drying device.

The auxiliary drying device may further comprise a rack, on which laundry is laid. Preferably, the rack is arranged in the drawer such that the interior of the laundry container is partitioned into upper and lower spaces by the rack. The upper and lower spaces communicate with each other thragh the rack. The rack may be inclinedly arranged. It is preferred that the rack be downwardly inclined toward a position where air is introduced.

Preferably, an air guide is provided at the upper rear wall portion of the drawer such that air guide extends into the interior of the drawer. The air guide not only uniformly supplies air over the upper portion of the drawer, but also minimizes the interference between the introduction air and discharge air.

The laundry machine may include an operating unit for operating the auxiliary drying device in accordance with a user's selection. That is, the operating unit, which operates the auxiliary drying device, may be provided at the laundry machine, in place of the auxiliary drying device. The laundry machine may include a display unit for displaying an operation state of the auxiliary drying device. That is, the display unit, which displays an operation state of the auxiliary drying device, may be provided at the laundry machine, in place of the auxiliary drying device. Accordingly, the user can operate the auxiliary drying device through the operating unit provided at the laundry machine, and can check the operation state of the auxiliary drying device through the display unit provided at the laundry machine. In other words, the laundry machine may include the operating unit for operating the auxiliary drying device, separate from the operating unit for operating the laundry machine. Also, the laundry machine may include the display unit for displaying the operation state of the auxiliary drying device, separately from the display unit for displaying the operation state of the laundry machine. Of course, it may be possible to display the operation states of the laundry machine and auxiliary drying device, through a single display unit.

The auxiliary drying device may include an operating unit for operating the auxiliary drying device in accordance with a user's selection. The auxiliary drying device may also include a display unit for displaying an operation state of the auxiliary drying device.

The laundry machine and auxiliary drying device may include communication units for wired or wireless communications between the laundry machine and auxiliary drying device. Through the communication units, it may be possible to transmit and receive control signals.

In accordance with the present invention, it is possible to wash or dry a large amount of laundry through the laundry machine, while washing or drying a small amount of laundry through the auxiliary drying device. Accordingly, it is possible to achieve a convenience in use while saving energy. It is also possible to easily dry laundry including shoes, hats, etc. which are difficult to be dried using a conventional drum type drying machine.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

MODE FOR THE INVENTION

The present invention now will be described more fully hereinafter with reference to the accompanying drawings, in which preferred embodiments of the invention are shown. In a multiple laundry machine according to the present invention, a main laundry device thereof may be a general washing machine, a general drying machine, or a general washing/drying machine. Accordingly, no detailed description of the main laundry device will be given.

Figure 2:
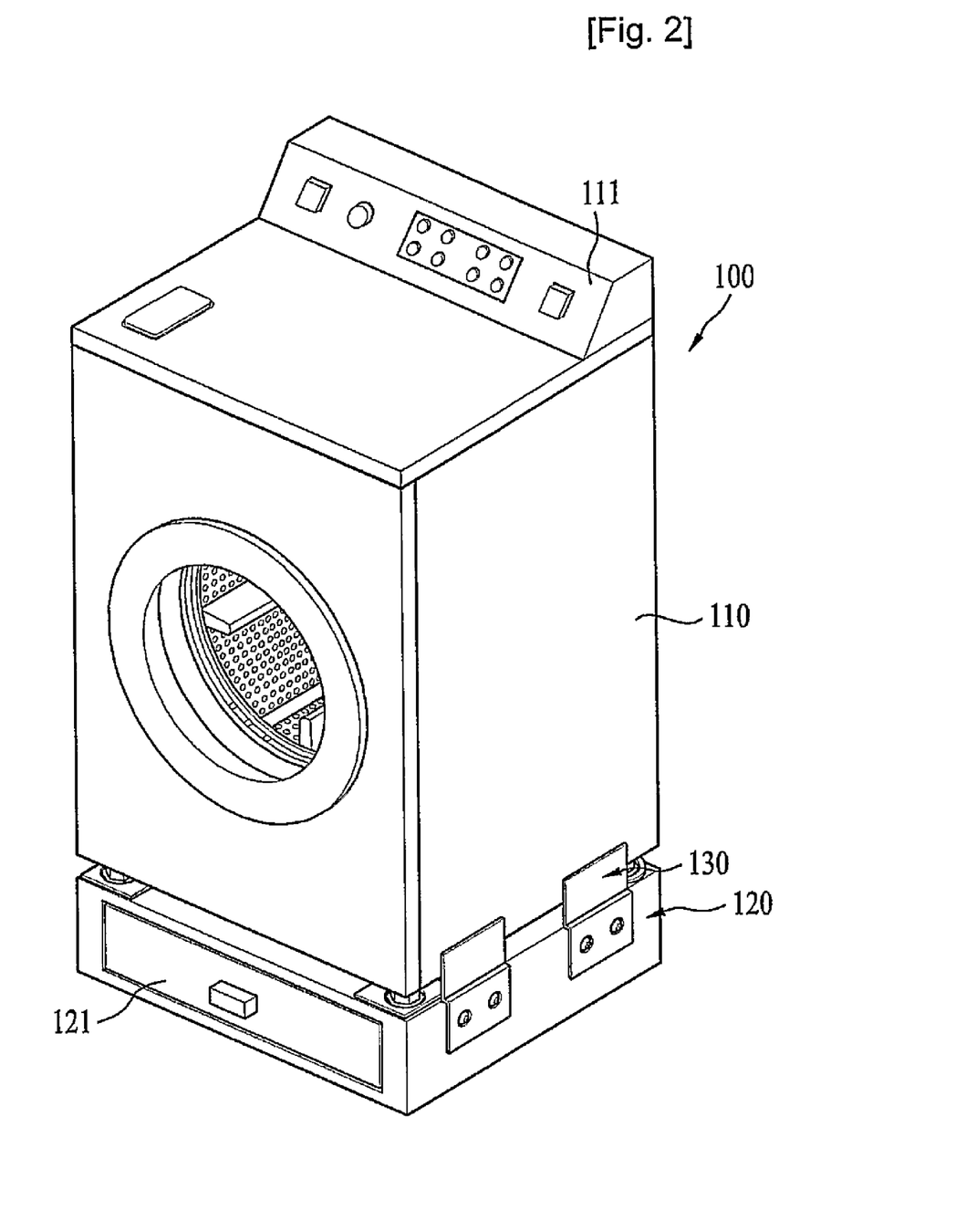
FIG. 2 is a perspective view illustrating a multiple laundry machine according to the present invention.
Figure 3:
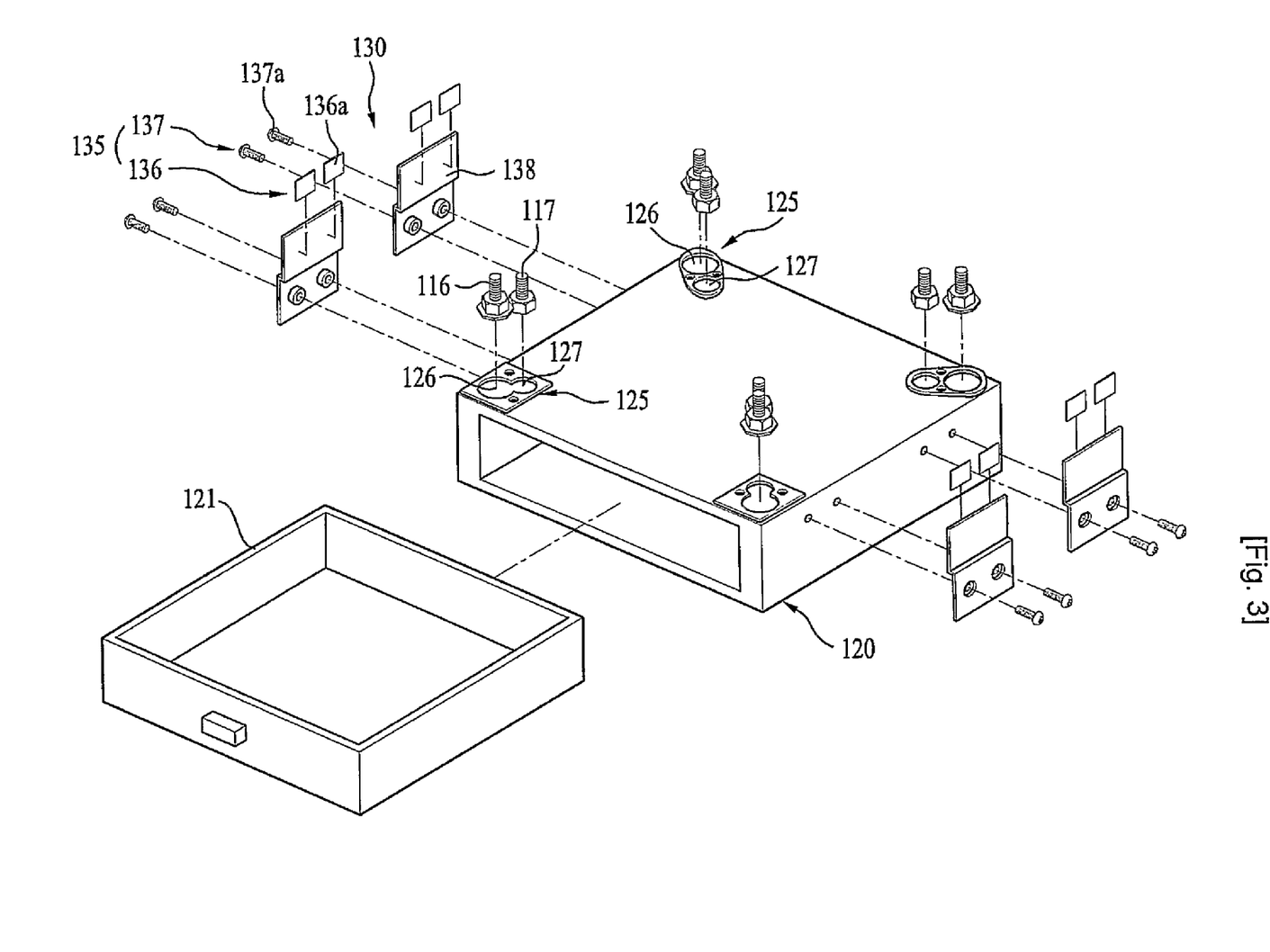
FIG. 3 is an exploded perspective view of an auxiliary drying device shown in FIG. 2.

Hereinafter, a multiple laundry machine according to an exemplary embodiment of the present invention will be described in detail with reference to FIGS. 2 and 3. The multiple laundry machine 100 according to the illustrated embodiment of the present invention includes a laundry machine 110 and an auxiliary drying device 120. The multiple laundry machine 100 may have the same cuter shape as the laundry machine 10, which is of the type including the pedestal 20, as shown in FIG. 1. However, as shown in FIGS. 2 and 3, the multiple laundry machine 100 of the present invention includes a pedestal not only functioning as a simple pedestal, but also performing an auxiliary drying function, different from the conventional pedestal. The multiple laundry machine 100 is also different from the conventional laundry machine in that a coupler 130 is mounted to the pedestal, to stably couple the auxiliary drying device 120 to the laundry machine 110.

In accordance with the present invention, the auxiliary drying device 120 is arranged at one side of the laundry machine 110, as shown in FIG. 2. For example, the auxiliary drying device 120 may be arranged beneath the laundry machine 110, as show in FIG. 2. Alternatively, the auxiliary drying device 120 may be arranged over the laundry machine 110. In the latter case, a controller for the laundry machine 110, in particular, a control panel 111, may be arranged at a front surface of the laundry machine 110.

The auxiliary drying device 120 may be arranged at one lateral side of the laundry machine 110. However, it is preferred that the auxiliary drying device 120 is arranged over or beneath the laundry machine 110, taking into consideration utilization of space and design.

As shown in FIGS. 2 and 3, the auxiliary drying device 120 is defined therein with a laundry container in accordance with the present invention. The multiple laundry machine also includes the coupler 130 as described above. The laundry machine 110 and auxiliary drying device 120 are coupled by the coupler 130. The auxiliary drying device 120 supports the laundry machine 110 on a floor.

The multiple laundry machine 100 may further include leg supporters 125 provided at the top of the auxiliary drying device 120, to support side surfaces of lower legs 116 and 117 mounted to the bottom of the laundry machine 110.

Each leg supporter 125 comprises a panel formed with a first seating hole 126 for providing a seat for one leg 116 included in the laundry machine 110, in the case in which the laundry machine 110 is a washing machine, and a second seating hole 127 for providing a seat for one leg 117 included in the laundry machine 110, in the case in which the laundry machine 110 is a drying machine. Each leg supporter 125 is mounted to the top of the auxiliary drying device 120 by means of screws. Here, the washing machine and drying machine are examples of laundry machines, in which the outer size of the washing machine is larger than that of the drying machine.

The leg supporters 125 are fixed to respective corners of the top of the auxiliary drying device 120. In each of the leg supporters 125 fixed to the front corners of the auxiliary drying device 120, the first and second seating holes 126 and 127 are connected to each other. On the other hand, in each of the leg supporters 125 fixed to the rear corners of the auxiliary drying device 120, the first and second seating holes 126 and 127 are separated from each other. In accordance with these structures, it is possible to easily achieve the seating of the legs 116 for the washing/drying machine.

Accordingly, the position of the laundry machine 110 with respect to the auxiliary drying device 120 is automatically determined, simultaneously with the seating of the leg supporters 125 on the seats of the first seating holes 126 or second seating holes 127.

In each leg supporter 125, the first seating hole 126 is arranged outside the second seating hole 127 along a diagonal line on the bottom of the laundry machine 110. This is because, typically, the washing machine is larger than the drying machine.

The coupler 130 includes coupling members 138 each mounted to both the lower portion of a side surface of the laundry machine 110, which may be a washing machine or drying machine, and the upper portion of a side surface of the auxiliary drying device 120, and fixing members 135 for fixing each coupling member 138 to both the associated side surface of the laundry machine 110 and the associated side surface of the auxiliary drying device 120.

As shown in FIG. 3, the coupler 130 may include at least two coupling members 138 each coupling the adjacent side surfaces of the auxiliary drying device 120 and laundry machine 110, each of which has a hexahedral shape.

In addition to the above-described configuration, the coupler 130 may further include a third coupling member (not shown) for coupling the rear surfaces of the auxiliary drying device 120 and laundry machine 110.

The coupler 130 may be configured to cope with a variation in the height of the washing machine legs 116 or drying machine legs 117.

Each fixing member 135 includes a first fixing member 136 for fixing an upper portion of the associated coupling member 138 to a lower portion of the side surface of the laundry machine 110, namely, the washing machine or drying machine, to which the coupling member 138 is mounted, and a second fixing member 137 for fixing a lower portion of the coupling member 138 to an upper portion of the side surface of the auxiliary drying device 120, namely, the pedestal, to which the coupling member 138 is mounted.

At least one of the first and second fixing members 136 and 137 may comprise a member coated, at opposite surfaces thereof, with an adhesive material, for example, a double-sided tape.

Alternatively, at least one of the first and second fixing members 136 and 137 may comprise a fastener such as a screw. Where screws are used for each fixing member 135, the associated coupling member 138 preferably has fastening holes formed through the upper portion of the coupling member 138 while being spaced apart from each other by a certain distance.

Of course, the coupler for coupling the laundry machine 110 and auxiliary drying device 120 may have various configurations different from the above-described configuration.

In the present invention, it is preferred that the volume of the auxiliary drying device 120 be smaller than the volume of the laundry machine 110, to which the auxiliary drying device 120 is coupled. It is also preferred that the height of the auxiliary drying device 120 be shorter than the height of the laundry machine 110. This is because the auxiliary drying device 120 is adapted to perform auxiliary functions for the laundry machine 110 in the present invention.

Where the auxiliary drying device 120 functions as a pedestal for the laundry machine 110, it is preferred that at least one of the lateral and longitudinal widths of the auxiliary drying device 120 be equal to or longer than that of the laundry machine 110, taking into consideration the stability and appearance design of the multiple laundry machine 100. However, where the auxiliary drying device 120 is coupled to the top of the laundry machine 110, it is preferred that at least one of the lateral and longitudinal widths of the auxiliary drying device 120 be equal to or shorter than that of the laundry machine 110.

Hereinafter, the configuration of the auxiliary drying device of the present invention will be described in detail with reference to FIG. 4.

Figure 4:
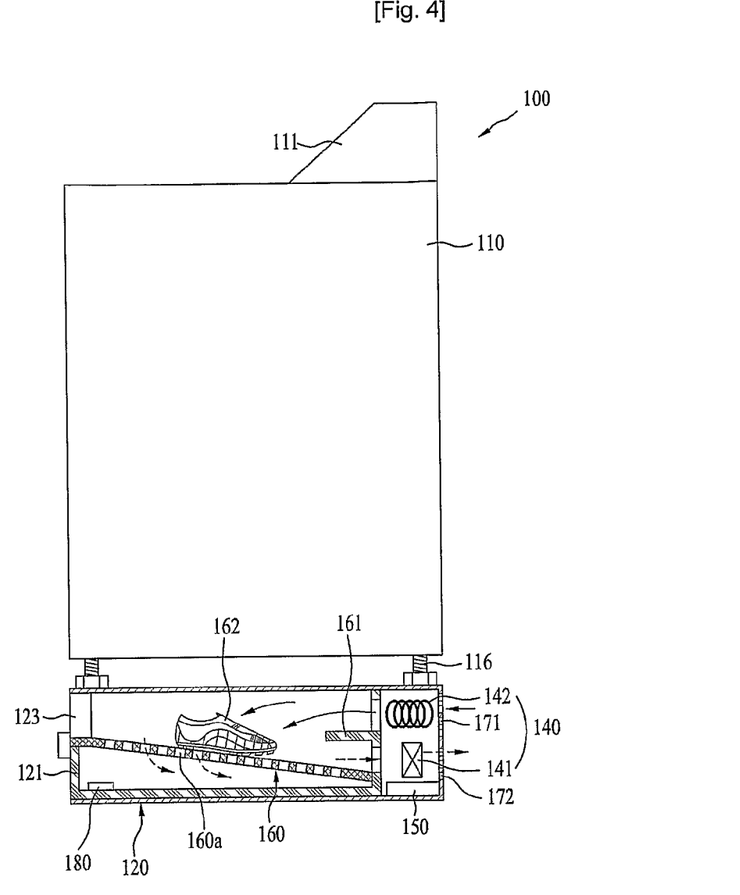
FIG. 4 is a sectional view simply illustrating the multiple laundry machine according to the present invention.

FIG. 4 is a sectional view simply illustrating the configuration of the auxiliary drying device of the present invention.

In accordance with the present invention, the auxiliary drying device 120 is coupled to the laundry machine 110, to form one multiple laundry machine 100. In this case, the laundry machine 110 receives laundry therein, and performs a washing or drying operation for the laundry. That is, the laundry machine 110 may be a general washing machine or a washing/drying machine.

The multiple laundry machine 100 includes a coupler 130 for coupling the auxiliary drying device 120 to one side of the laundry machine 110. The coupler 130 is not shown in FIG. 4.

The auxiliary drying device 120 includes a laundry container defined in the interior of the auxiliary drying device 120 in the form of a space to contain laundry therein, in order to perform auxiliary functions associated with laundry treatment. Although the laundry container may have various shapes, it is preferred that the laundry container have the form of a drawer 121, which can be forwardly drawn at the front side of the auxiliary drying device 120. Of course, the laundry container is not limited to the form of the drawer 121. For the convenience of the description, however, the following description will be given in conjunction with the case, in which the laundry container is the drawer 121.

The auxiliary drying device 120 includes a driver, which may be of various types, to dry or refresh laundry, shoes, etc. contained in the laundry container 121.

The driver includes an air supplier 140 for forcibly supplying air to the laundry container 121.

The driver also includes a steam supplier 150 for supplying steam to the laundry container 121. The steam supplier 150 includes nozzles (not shown), to spray steam into the laundry container 121 from the top or rear side of the auxiliary drying device 120.

The air supplier 140 includes a blowing fan 141 for blowing air, and a heater 142 for heating air. As the blowing fan 141 operates, ambient air is introduced into the laundry container, namely, the drawer 121, and is then outwardly discharged out of the drawer 121. The ambient air is introduced into the drawer 121 after being heated by the heater 142.

The heater 142 may be of various types, for example, an electric type or a gas type. Taking into consideration the installation space of the auxiliary drying device 120, it is preferred that the heater 142 be of an electric type.

Thus, the auxiliary drying device 120 according to the present invention can perform a drying function through the air supplier 140. It is preferred that the heater 142 be a capacity-variable heater capable of varying the temperature of air heated by the heater. This is because specific clothes exhibit a low resistance to heat, and in particular, shoes made of a rubber material exhibit a low resistance to heat.

The driver may include at least one of a temperature sensor for sensing the internal temperature of the laundry container 121 and a humidity sensor for sensing the internal humidity of the laundry container 121. Accordingly, it is possible to appropriately control the drying time or the temperature of supplied air by sensing the internal temperature or humidity of the laundry container 121.

The steam supplier 150 supplies steam to the interior of the laundry container 121. The supplied steam comes into contact with laundry contained in the laundry container 121, and thus performs sterilization of the laundry and removal of creases, odor, etc. from the laundry. Thus, the auxiliary drying device 120 performs a refresh function through the steam supplier 150. Of course, the above-described drying function is carried out, together with the refresh function.

Meanwhile, it is preferred that inlets 171 be formed at an upper portion of the rear wall of the auxiliary drying device 120, to introduce air into the auxiliary drying device 120. Also, it is preferred that outlets 172 be formed at a lower portion of the rear wall of the auxiliary drying device 120, to outwardly discharge air from the auxillary drying device 120. The rear wall of the laundry container 121 communicates, at an upper portion thereof, with the inlets 171. The rear wall of the laundry container 121 also communicates, at a lower portion thereof, with the outlets 172. Accordingly, ambient air is introduced into the interior of the laundry container 121 via the upper rear wall portion of the auxiliary drying device 120 and the upper rear wall portion of the laundry container 121, and is then discharged from the interior of the laundry container 121 via the lower rear wall portion of the laundry container 121 and the lower rear wall portion of the auxiliary drying device 120.

The blowing fan 141, which functions to generate a flow of air, and the heater 142, which heats air, may be arranged between the rear wall of the laundry container 121 and the rear wall of the auxiliary drying device 120. However, the arrangement of these elements is not limited to the above-described arrangement. The air supplier 140, which includes the blowing fan 141 and heater 142 as described above, may be arranged at any position in a path, along which air is introduced or discharged. Although not shown in FIG. 4, it is preferred that the spaces, where the blowing fan 141 and heater 142 are arranged, respectively, be partitioned from each other.

FIG. 4 illustrates an arrangement in which air is introduced through the upper portion of the laundry container 121, and is discharged through the lower portion of the laundry container 121. However, it may be possible to implement an arrangement in which air is introduced through the lower portion of the laundry container 121, and is discharged through the upper portion of the laundry container 121.

Meanwhile, a rack 160 may be arranged in the laundry container 121 such that the interior of the laundry container 121 is partitioned into upper and lower spaces by the rack 160, as shown in FIG. 4. The upper and lower spaces communicate with each other through the rack 160. Laundry 162 may be laid on the rack 160. The rack 160 functions to allow air supplied to the laundry 162 to be smoothly discharged.

It is preferred that a plurality of through holes 160*a* be formed through the rack 160. In this case, air present in the upper portion of the laundry container 121 can be introduced into the lower portion of the laundry container 121 through the through holes 160*a*.

The rack 160 may be inclinedly arranged. In this case, it is preferred that the rack 160 be downwardly inclined toward a position where air is introduced. In this case, accordingly, air can be uniformly supplied to the laundry laid on the rack 160.

Preferably, an air guide 161 is provided at the upper rear wall portion of the laundry container 121. The air guide 161 not only functions to allow air to smoothly reach the front side of the laundry container 121, but also functions to partition the low paths of introduction air and discharge air. Accordingly, it is possible to minimize the interference between the introduction air and discharge air, and thus to achieve an enhancement in the operation efficiency, for example, the drying efficiency.

As shown in FIG. 4, the auxiliary drying device 120 may include a control panel 123 separate from the control panel 111 of the laundry machine 110. The control panel 123 may include a controller for controlling the operation of the auxiliary drying device 120, an operating unit for operating the auxiliary drying device 120 in accordance with a user's selection, and a display unit for displaying an operation state of the auxiliary drying device 120, a communication unit for performing wired or wireless communications with the laundry machine 110. Of course, the control panel 123 may include only one of the above-described units. Also, the control panel 123 itself may be dispensed with, as will be described later.

The multiple laundry machine 100 according to the present invention may be controlled in various types.

Hereinafter, the operation control type of the multiple laundry machine 100 according to the present invention, in particular, the operation control type for the auxiliary drying device 120, will be described with reference to FIGS. 5 to 11. Since the laundry machine 110 of the multiple laundry machine 100 can be controlled in a conventional operation control type, no description will be given of the operation control type for the laundry machine 110.

Figure 5:
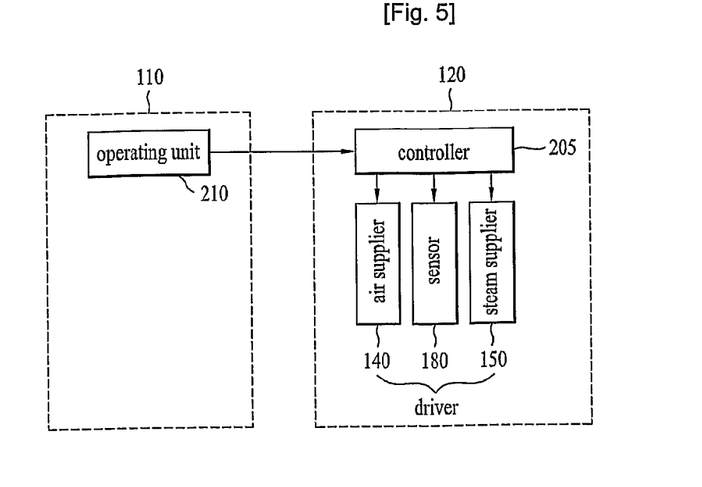
FIG. 5 is a block diagram illustrating a first embodiment of the operation control type for the auxiliary drying device according to the present invention.

First, a first embodiment of the operation control type for the auxiliary drying device 120 in the multiple laundry machine 100 according to the present invention will be described with reference to FIG. 5.

In the illustrated embodiment, the operation of the auxiliary drying device 120 is controlled by a controller 205 provided at the auxiliary drying device 120. Alternatively, the controller 205 may be provided at the control panel 123 of the auxiliary drying device 120.

In this embodiment, the operating unit 210, which operates the auxiliary drying device 120 in accordance with a user's selection, is provided at the laundry machine 110. For example, the operating unit 210 is arranged at the control panel 111 of the laundry machine 110.

Accordingly, the user can operate the auxiliary drying device 120 through the operating unit 210 provided at the laundry machine 110. In accordance with a signal generated from the operating unit 210 in accordance with the operation by the user, the controller 205 provided at the auxiliary drying device 120 controls the driver.

Hereinafter, a second embodiment of the operation control type for the auxiliary drying device 120 according to the present invention will be described with reference to FIG. 6.

Figure 6:
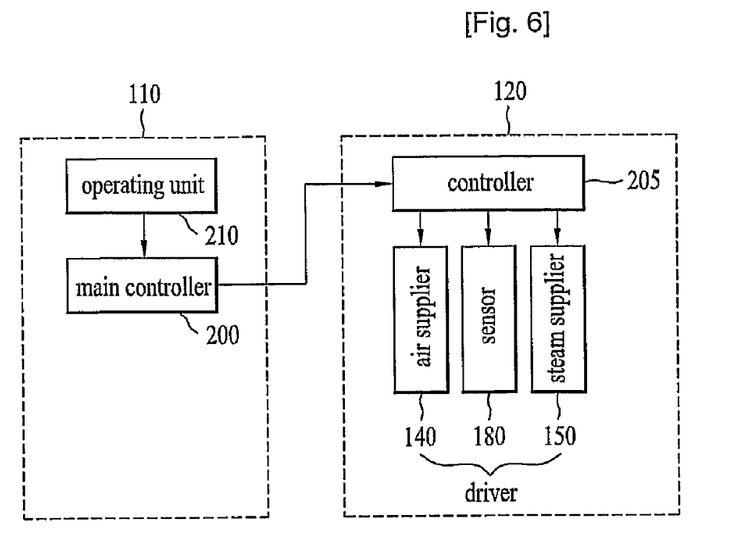
FIG. 6 is a block diagram illustrating a second embodiment of the operation control type for the auxiliary drying device according to the present invention.

In this embodiment, an operating unit 210, which operates the auxiliary drying device 120 in accordance with a user's selection, is provided at the laundry machine 110, as shown in FIG. 6. The user operates the operating unit 210, to select a desired operation mode of the auxiliary drying device 120. An operating signal generated from the operating unit 210 is sent to a main controller 200 included in the laundry machine 110. The main controller 200 is adapted to control the laundry machine 110. The main controller 200 sends the received operating signal to a controller 205 included in the auxiliary drying device 120. In response to the received signal, the controller 205 controls the driver of the auxiliary drying device 120.

The main controller 200 and controller 205 can communicate with each other in a wired or wireless manner. The communications can be achieved through communication units 230 and 235 (FIG. 7) respectively included in the laundry machine 110 and auxiliary drying device 120.

A third embodiment of the operation control type for the auxiliary drying device 120 according to the present invention will be described with reference to FIG. 7.

Figure 7:
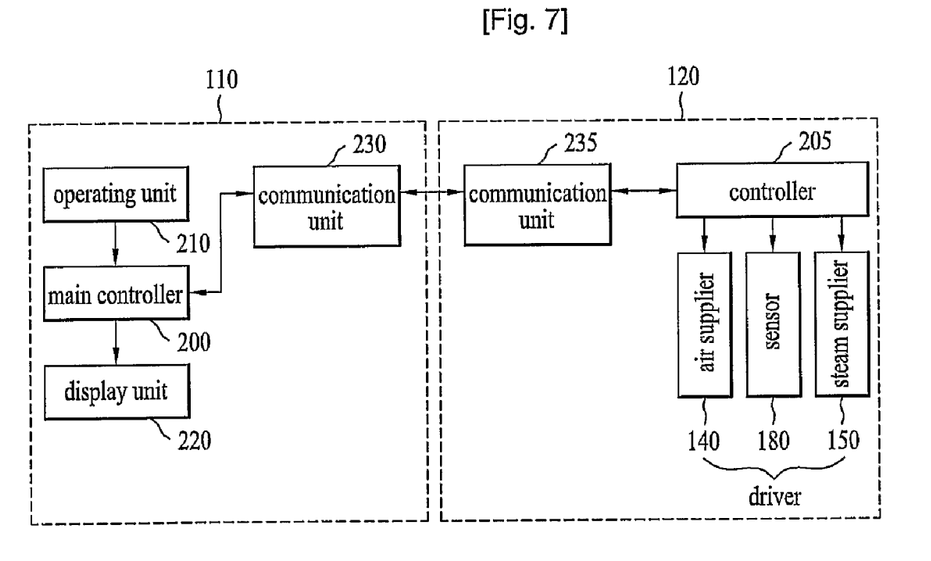
FIG. 7 is a block diagram illustrating a third embodiment of the operation control type for the auxiliary drying device according to the present invention.

As shown in FIG. 7, this embodiment is identical to the second embodiment, except that a display unit 220, which displays an operation state of the auxiliary drying device 120, is provided at the laundry machine 110. In this embodiment, the user can easily check the operation state of the auxiliary drying device 120, a residual drying time, etc. The display unit 220 may be a display unit for the laundry machine 110, as in conventional cases. In this case, information as to whether or not the laundry machine 110 operates and information as to whether or not the auxiliary drying device 120 operates may be displayed in a simultaneous or sequential manner. The display unit 220 may be arranged at the control panel 111.

A fourth embodiment of the operation control type for the auxiliary drying device 120 according to the present invention will be described with reference to FIG. 8.

Figure 8:
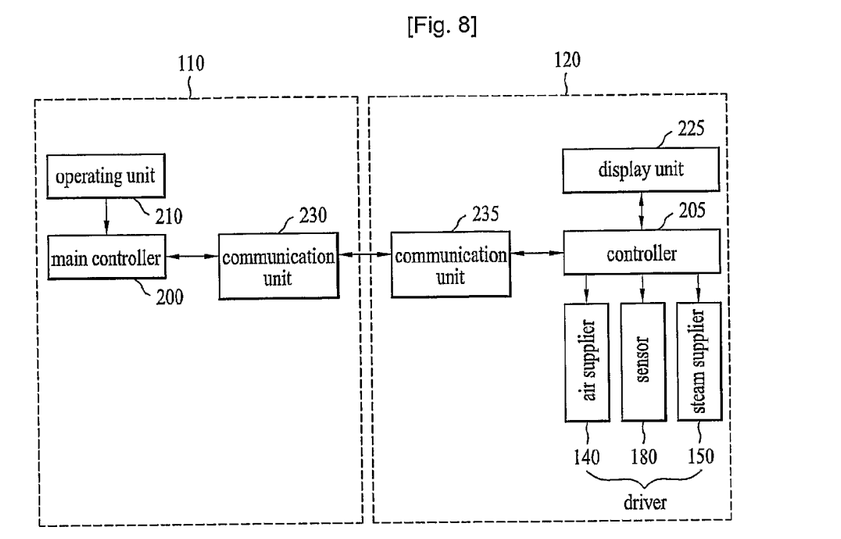
FIG. 8 is a block diagram illustrating a fourth embodiment of the operation control type for the auxiliary drying device according to the present invention.

As shown in FIG. 8, this embodiment is identical to the second embodiment, except that a display unit 220, which displays the operation state of the auxiliary drying device 120, is provided at the auxiliary drying device 120. Of course, the driver of the auxiliary drying device 120 is controlled through the control unit 205 provided at the auxiliary drying device 120.

Preferably, the main controller 200 and controller 205 are connected by communication units 230 ad 235. The communication units 230 and 235 may be implemented in the form of communication ICs. Also, the communication units 230 and 235 may be implemented in a wired or wireless manner. Since wireless communication units can be easily implemented, using light emitters and light receivers, by a skilled person in the technical field, no description thereof will be given.

Figure 9:
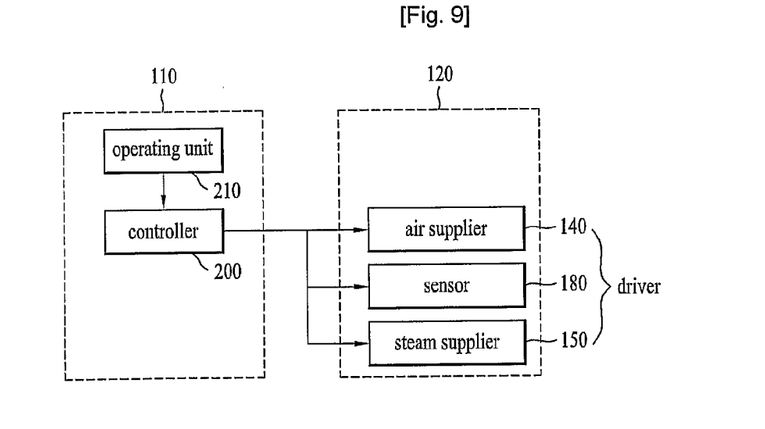
FIG. 9 is a block diagram illustrating a fifth embodiment of the operation control type for the auxiliary drying device according to the present invention.

A fifth embodiment of the operation control type for the auxiliary drying device 120 in the multiple laundry machine 100 according to the present invention will be described with reference to FIG. 9.

In this embodiment, the auxiliary drying device 120 is controlled by a controller 200 provided at the laundry machine 110. That is, this embodiment is different from the first to fourth embodiments in that the auxiliary drying device 120 is controlled by the controller 200 provided at the laundry machine 110. In each of the first to fourth embodiments, the auxiliary drying device 120 is controlled by the controller 200 provided at the laundry machine 110.

The controller 200 may be a controller for the laundry machine 110, as in conventional cases. Alternatively, the controller 200 may be a controller separate from the controller for the laundry machine 110. The controller 200 and the driver of the auxiliary drying device 120, for example, the air supplier 140, steam supplier 150, and sensor 180, are connected in a wired or wireless manner so that a control signal can be sent from the controller 200 to the driver. On the other hand, the controller 200 may be arranged at the control panel 111 of the laundry machine 110.

In this embodiment, an operating unit 210, which operates the auxiliary drying device 120 in accordance with a user's selection, is provided at the laundry machine 110. The user can operate the operating unit 210, to select a desired operation mode of the auxiliary drying device 120. In accordance with the operation mode selected through the operating unit 210, the controller 200 appropriately controls the driver of the auxiliary drying device 120. The operating unit 210 may be arranged at the control panel 111 of the laundry machine 110.

Thus, the user operates the auxiliary drying device 120 through the operating unit 210 provided at the laundry machine 110. In response to a signal generated from the operating unit 210, the controller 200 provided at the laundry machine 110 appropriately controls the driver of the auxiliary drying device 120.

A sixth embodiment of the operation control type for the auxiliary drying device 120 according to the present invention will be described with reference to FIG. 10.

Figure 10:
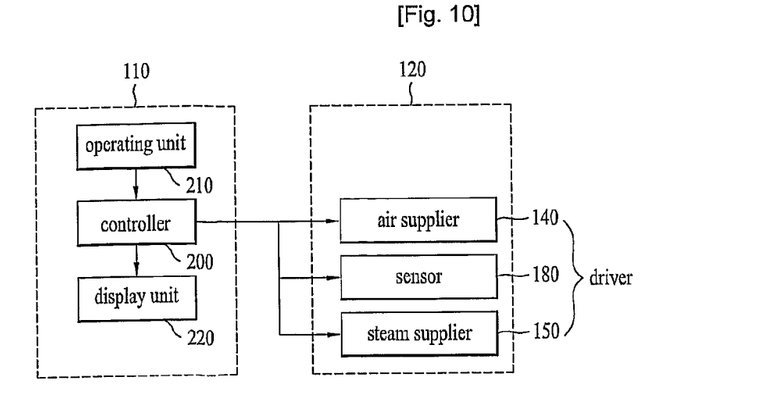
FIG. 10 is a block diagram illustrating a sixth embodiment of the operation control type for the auxiliary drying device according to the present invention.

As shown in FIG. 10, this embodiment is identical to the fifth embodiment, except that a display unit 220, which displays an operation state of the auxiliary drying device 120, is provided at the laundry machine 110. In this embodiment, the user can easily check the operation state of the auxiliary drying device 120, a residual drying time, etc. The display unit 220 may be a display unit for the laundry machine 110, as in conventional cases. In this case, information as to whether or not the laundry machine 110 operates and information as to whether or not the auxiliary drying device 120 operates may be displayed in a simultaneous or sequential manner.

In this embodiment, the display unit 220 may be arranged at the control panel 111. Thus, all the operating unit 210, controller 200, and display unit 220 may be arranged at the control panel 111 of the laundry machine 110. Accordingly, the user can operate the auxiliary drying device 120, as well as the laundry machine 110, through the control panel 111 of the laundry machine 110, and can check the operation states of the laundry machine 110 and auxiliary drying device 120.

A seventh embodiment of the operation control type for the auxiliary drying device 120 according to the present invention will be described with reference to FIG. 11.

Figure 11:
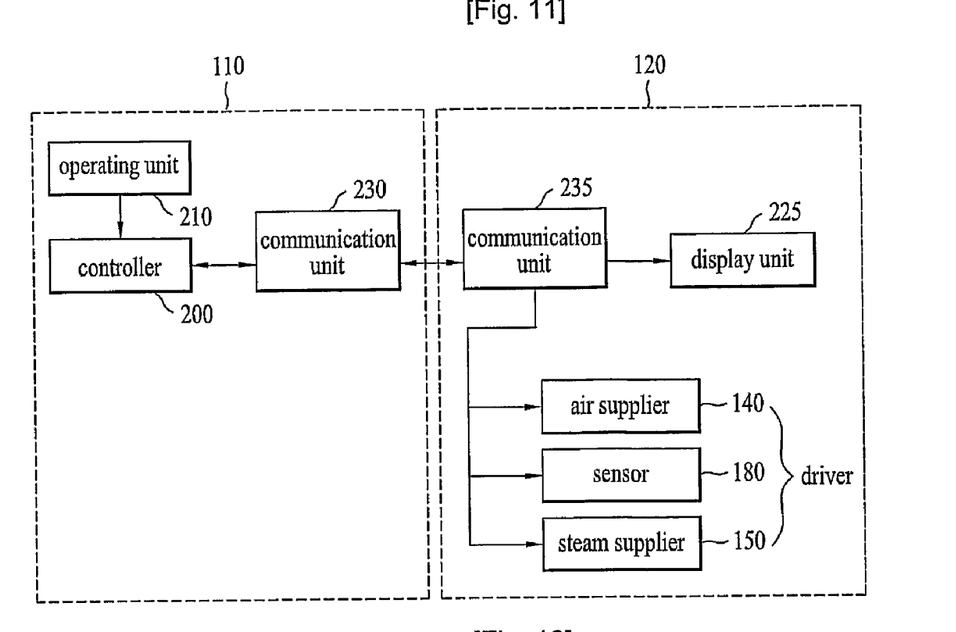
FIG. 11 is a block diagram illustrating a seventh embodiment of the operation control type for the auxiliary drying device according to the present invention.

As shown in FIG. 11, this embodiment is identical to the sixth embodiment, except that a display unit 225, which displays the operation state of the auxiliary drying device 120, is provided at the auxiliary drying device 120. In this embodiment, the user can easily check the operation state of the auxiliary drying device 120, a residual drying time, etc. The display unit 225 may be arranged at the control panel 123 of the auxiliary drying device 120.

An eighth embodiment of the operation control type for the auxiliary drying device 120 according to the present invention will be described with reference to FIG. 12.

Figure 12:
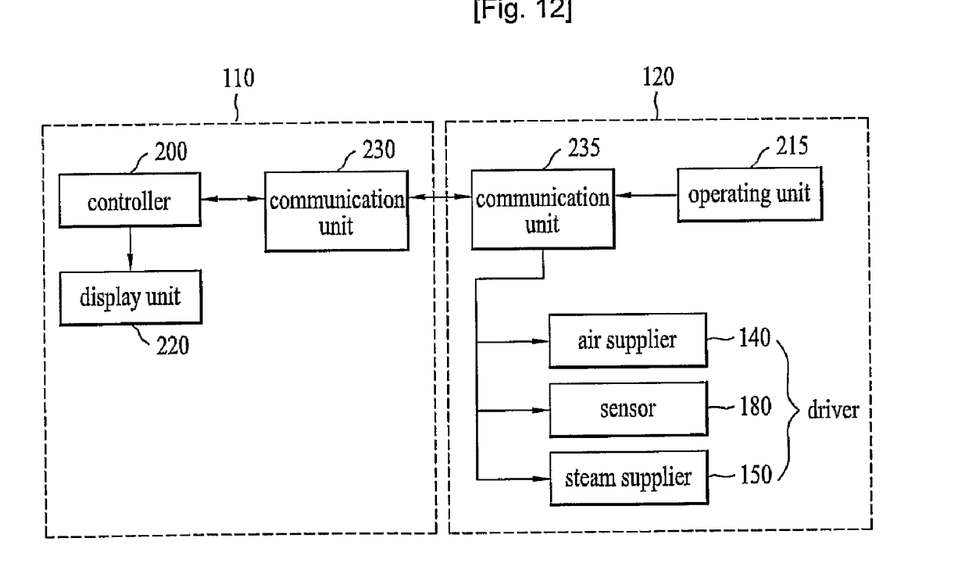
FIG. 12 is a block diagram illustrating an eighth embodiment of the operation control type for the auxiliary drying device according to the present invention.

As shown in FIG. 12, in this embodiment, an operating unit 215, which operates the auxiliary drying device 120 in accordance with a user's selection, is provided at the auxiliary drying device 120. Also, a display unit 220, which displays the operation state of the auxiliary drying device 120, is provided at the laundry machine 110. That is, this embodiment is different from the above-described embodiments in that the operating unit 215, which operates the auxiliary drying device 120 in accordance with a user's selection, is provided at the auxiliary drying device 120.

The driver of the auxiliary drying device 120 is controlled by a controller 200 provided at the laundry machine 110. Of course, the driver of the auxiliary drying device 120 may be controlled by a controller provided at the auxiliary drying device 120.

Figure 13:
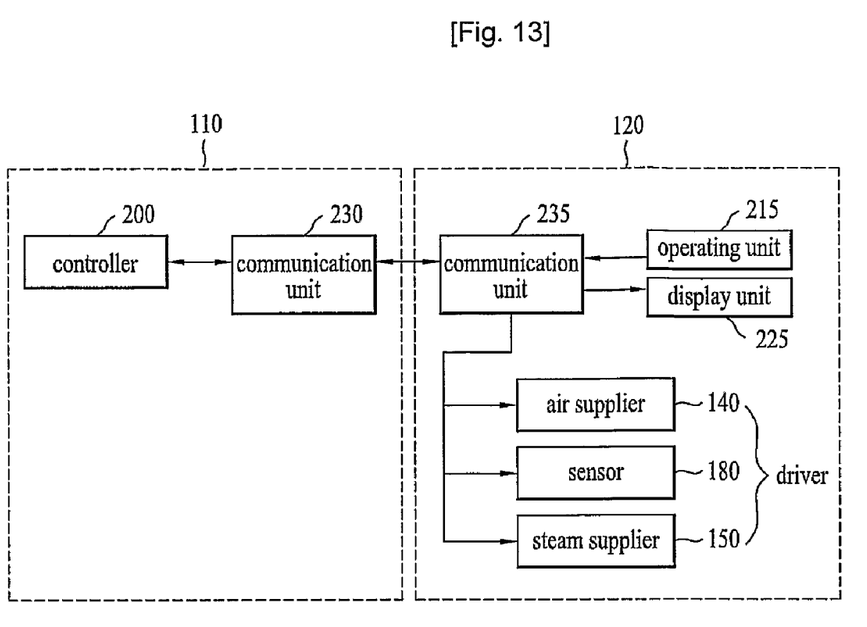
FIG. 13 is a block diagram illustrating a ninth embodiment of the operation control type for the auxiliary drying device according to the present invention.

A ninth embodiment of the operation control type for the auxiliary drying device 120 according to the present invention will be described with reference to FIG. 13.

As shown in FIG. 12, this embodiment is different from the eighth embodiment in that a display unit 225, which displays the operation state of the auxiliary drying device 120, is provided at the auxiliary drying device 120, together with the operating unit 215. The driver of the auxiliary drying device 120 may be controlled by the controller 200 provided at the laundry machine 110 or by a controller provided at the auxiliary drying device 120.

A large number of control lines may be required to transmit control signals between the controller 200 and the driver and between the controller 200 and the display unit 225, and to transmit operation signals generated through the operating unit 215 to the controller 200. In order to solve this problem, it is preferred that communication units 230 and 235 be provided at the laundry machine 110 and auxiliary drying device 120, respectively. The communication units 230 and 235 may be implemented in the form of communication ICs. Also, the communication units 230 and 235 may be implemented in a wired or wireless manner. Since wireless communication units can be easily implemented, using light emitters and light receivers, by a skilled person in the technical field, no description thereof will be given.

Meanwhile, where control lines or communication lines for transmission of control or communication signals are connected between the laundry machine 110 and the auxiliary drying device 120 in a wired manner, in the above-described embodiments, it is preferred that the control lines or communication lines have the form of harnesses. The harnesses may be easily connected through connectors.

Hereinafter, the operation of the multiple laundry machine 100, in particular, the auxiliary drying device 120, will be described in detail. The operation of the auxiliary drying device 120 may be carried out, simultaneously with or independently of the operation of the laundry machine 110.

First, the user draws the laundry container 121, and then lays laundry 162, which may be a small amount of clothes, shoes, or hats, on the rack 160. When the laundry 162 is clothes, it is desirable to spread the cloths on the rack 160.

Thereafter, the user selects a desired operation mode in accordance with the kind of the laundry, thrash the operating unit 210 or 215. The operation mode may include various drying modes and a refresh mode.

The drying modes may be divided in accordance with a drying time and a drying temperature. The drying time and drying temperature may be determined in accordance with the kind of laundry. For example, when it is desired to dry a small amount of clothes made of cotton, a drying mode having a short drying time and a high drying temperature may be set. On the other hand, for shoes, a drying mode having a long drying time and a low drying temperature may be set.

That is, the temperature and supply time of air forcibly supplied to the space, in which laundry is contained, are varied, depending on the operation mode selected by the user.

When the operation mode is the refresh mode, high-temperature steam is supplied to the laundry. Accordingly, refresh of the laundry is carried out by the steam. That is, removal of odor and creases from the laundry and sterilization of the laundry are achieved. After the completion of the refresh mode, air may be supplied to dry the laundry, if necessary.

The controller 200 controls the driver of the auxiliary drying device 120 to drive appropriately, in accordance with the operation mode selected by the user. Meanwhile, the user can check the operation state of the auxiliary drying device 120, through the display unit 220 or 225.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

In accordance with the present invention, it is possible to achieve a convenience in use and to save energy by the provision of an auxiliary drying device capable of treating a small amount of laundry without driving a laundry machine having a relatively-large capacity.

It is also possible to easily add a drying function to a washing machine only having a washing function.

Also, it is possible to easily dry laundry including shoes, hats, etc. which are difficult to be dried using a conventional drum type drying machine. It is also possible to utilize an auxiliary space in a conventional laundry machine, for example, a pedestal, as an auxiliary drying device.

Thus, in accordance with the present invention, it is possible to provide an inexpensive multiple laundry machine achieving a maximal use of space, and thus a convenience in use.

In accordance with the present invention, washing and drying operations can be simultaneously carried out in one multiple laundry machine. Also, two different drying methods may be simultaneously carried out for different kinds of laundry. Accordingly, there are effects of achieving a convenience in use and saving of time.

The invention claimed is:

1. A multiple laundry machine comprising:
   a laundry machine for washing or drying laundry contained in an interior of the laundry machine;
   an auxiliary drying device arranged at one side of the laundry machine, the auxiliary drying device having a laundry container formed in an interior of the auxiliary drying device,
   wherein the laundry container has a form of a drawer which can be forwardly drawn at a front side of the auxiliary drying device, and a rear wall of the drawer has an inlet and an outlet;
   an air guide provided at the rear wall of the drawer such that the air guide is located between the inlet of the drawer and the outlet of the drawer; and
   a driver provided at the auxiliary drying device, to drive the auxiliary drying device, wherein the driver comprises an air supplier having a blowing fan for blowing air and a heater for heating air;
   wherein a rear wall of the auxiliary drying device has an inlet which communicates with the inlet of the drawer and an outlet which communicates with the outlet of the drawer, and
   the blowing fan is located between the outlet of the drawer and the outlet of the auxiliary drying device, and the heater is located between the inlet of the drawer and the inlet of the auxiliary drying device.

2. The multiple laundry machine according to claim 1, wherein the auxiliary drying device has a volume and a height respectively smaller than a volume and a height of the laundry machine.

3. The multiple laundry machine according to claim 1, further comprising:
   a coupler for coupling the auxiliary drying device to one side of the laundry machine.

4. The multiple laundry machine according to claim 1, wherein the auxiliary drying device is a pedestal for supporting a bottom of the laundry machine on a floor.

5. The multiple laundry machine according to claim 1, wherein the driver further comprises at least one of a temperature sensor for sensing an internal temperature of the laundry container and a humidity sensor for sensing an internal humidity of the laundry container.

6. The multiple laundry machine according to claim 1, wherein the driver further comprises a steam supplier for supplying steam to the laundry container.

7. The multiple laundry machine according to claim 1, wherein the driver is controlled by a controller provided at the auxiliary drying device.

8. The multiple laundry machine according to claim 1, further comprising:
   a main controller for controlling an operation of the laundry machine, the main controller being provided at the laundry machine,
   wherein the driver is controlled by the main controller.

9. The multiple laundry machine according to claim 1, further comprising:
   a display unit for displaying an operation state of the auxiliary drying device, the display unit being provided at the laundry machine.

10. The multiple laundry machine according to claim 1, further comprising:
    a display unit for displaying an operation state of the auxiliary drying device, the display unit being provided at the auxiliary drying device.

11. The multiple laundry machine according to claim 1, further comprising:
    an operating unit for operating the auxiliary drying device in accordance with a user's selection, the operating unit being provided at the laundry machine.

12. The multiple laundry machine according to claim 1, further comprising:
    an operating unit for operating the auxiliary drying device in accordance with a user's selection, the operating unit being provided at the auxiliary drying device.

13. The multiple laundry machine according to claim 1, further comprising: a communication unit for enabling data communications between the laundry machine and the auxiliary drying device in a wired or wireless manner.

* * * * *